Aug. 25, 1959 E. L. WOLF 2,901,641
THREE-STATE ELECTRONIC CIRCUIT
Filed Jan. 14, 1957
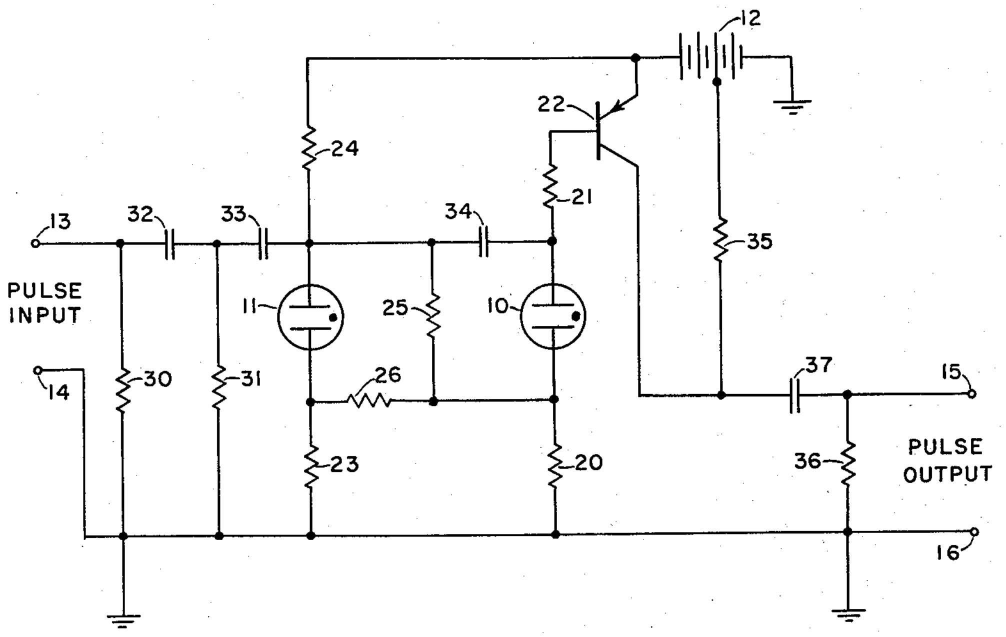
INVENTOR.
EDWARD L. WOLF
BY Francis E. Blake
ATTORNEY United States Patent Office 2,901,641
Patented Aug. 25, 1959

2,901,641

THREE-STATE ELECTRONIC CIRCUIT

Edward L. Wolf, Fairport, N.Y., assignor to General Dynamics Corporation, Rochester, N.Y., a corporation of Delaware Application January 14, 1957, Serial No. 633,988

4 Claims. (Cl. 307—88.5)

The present invention relates to indicating and counting circuits and, more particularly, to an electronic circuit for indicating or counting the relative order of occurrence of discrete electrical pulses.

Scaling circuits for counting or indicating the relative order of occurrence of electrical pulses are well known. Usually, the counting circuit is either a decimal type or a binary scale of two type. There are, however, occasions when a so-called trinary circuit having a scaling factor of three to indicate or count the relative order of discrete pulses would be advantageous.

It is a principal object of this invention to provide a three-state electronic circuit which may be used to indicate the relative order of occurrence of discrete electrical pulses on a scale of three basis.

It is also an object of this invention to provide a three-state electronic circuit which may be used as a scale of three counting circuit to provide one electrical pulse output signal for each third electrical input pulse applied to the circuit.

Yet another object of the invention is to provide an improved pulse indicating or counting circuit which is extremely simple in form and uses inexpensive gas tube diode components.

Further objects and advantages of the invention will be apparent with reference to the following specification and drawing in which the single figure is a schematic wiring diagram of a three-state electronic circuit embodying the principles of the invention.

Referring to the drawing, a single stage of a three-state electronic circuit may be comprised of a pair of gas tube diodes 10 and 11 which may be of the well known type identified as NE–96. The NE–96 gas tube diode is a neon diode constant current device which requires a direct current potential of approximately one hundred and thirty volts or more thereacross to become conductive, but which will sustain conduction with a direct current potential thereacross of approximately sixty-five to seventy volts. A battery 12, having its negative terminal grounded, is connected to supply operating potentials for the circuit, as will be described in detail. Pulse input terminals 13 and 14, one of which is connected to ground, and pulse output terminals 15 and 16, one of which is connected to ground, are provided for applying the discrcte input pulses to be counted and connecting to the output pulse, respectively. The parameters of the circuit elements are selected to be such that discrete pulses to be counted having a certain minimum amplitude will cause the desired operation of the circuit, while the output pulse may be of any sufficient amplitude or characterization for use to indicate or to be subsequently amplified or modified for connection to subsequent electronic circuits.

The neon diode 10 is connected in series with resistors 20 and 21 and the base and emitter of transistor 22 across the positive and negative terminals of the battery 12. The back resistance value of the transistor 22 and the values of resistors 20 and 21 together with the amplitude of voltage supplied by battery 12 provide that the direct current potential normally applied across the electrodes of the diode 10 is of insufficient value to cause the diode 10 to fire and become conductive. According to the teachings of this invention, the value of the above-referred to potential normally maintained across the diode 10 is less than the firing potential for the diode 10 by an amount which is also less than the predetermined minimum amplitude of the pulses to be indicated as connected across the pulse input terminals 13 and 14.

Similarly, the diode 11 is connected in series with resistors 23 and 24 across the positive and negative terminals of the battery 12 and the arrangement is such that the potential normally across the diode 11 is insufficient to cause the diode 11 to fire and become conductive, but yet is not lower than the firing voltage for the diode by an amount greater than the minimum amplitude for the pulse to be counted when applied across input terminals 13 and 14. However, resistors 25 and 26 interconnect the energizing circuits for diodes 10 and 11 in such manner that the potential normally across diode 10 is somewhat greater than the potential across diode 11. This is important to assure the proper functioning of the circuit as will become apparent when the operation of the circuit is subsequently described.

The discrete voltage pulses to be counted are connected across the input terminals 13 and 14 and are coupled through a differentiating coupling network, including resistors 30, 31 and capacitors 32, 33 and 34, in parallel to both of the energizing networks for diodes 10 and 11. This arrangement is such that the differentiating action causes the input pulses to be counted to momentarily add to the potentials normally applied across both gas tubes 10 and 11 when neither gas tube is conducting. However, since the potential normally applied across gas tube 10 is higher than the potential applied across gas tube 11, the momentary increase of potential across diode 10 will exceed the firing potential of that tube before the momentary increase in potential across gas tube 11 reaches its firing potential value. Therefore, assuming that neither gas tube 10 or 11 is at first conducting, and assuming that the amplitude of the discrete voltage pulse to be counted is greater than the minimum value to add to the potential normally across either diode tube 10 or 11 to thereby exceed the firing voltage for such diodes, the gas tube diode 10 only will fire for the first input pulse and, in firing, will become conductive to cause current to flow through the transistor 22 and resistors 20 and 21. It is inherent in the circuit arrangement, as described, that as soon as gas tube 10 fires, the input pulse energy is absorbed so that the potential across gas tube 11 cannot continue to increase to the point where gas tube 11 would become conductive, bearing in mind that the potential normally applied across gas tube 11 is lower than that of gas tube 10 as stated above. The subsequent flow of current through the transistor 22 will produce a pulse output across the output network, includin gthe resistors 35, 36 and capacitor 37, to the pulse output terminals 15 and 16. Thus, the application of the first discrete pulse to be counted is indicated or counted by the conduction of gas tube 10 and the appearance of a distinctive pulse across the output terminals 15 and 16.

The second discrete voltage pulse to be indicated or counted as applied across terminals 13 and 14 and through the differentiating network, including capacitors 32—34, will raise the amplitude of potential across diode 11 sufficiently to cause such tube to become conductive and, such tube in becoming conductive, will, through the network including the capacitor 34 and resistors 25 and 26, produce a negative pulse across the diode 10 sufficient to momentarily lower the potential thereacross below the sustaining voltage amplitude value thereby extinguishing diode 10. Note that the amplitude of potential across tube 10 cannot be raised appreciably by the second pulse since that tube is already conducting. Thus, the application of the second discrete voltage pulse across input terminals 13 and 14 causes gas tube 10 to be extinguished and gas tube 11 to become conductive thereby indicating the occurrence of the second pulse.

When the third discrete voltage pulse is applied across the input terminals 13 and 14 to be connected by the differentiating network, including coupling capacitors 32 and 33, across the diode 11, since the diode 11 is then conducting, the voltage thereacross cannot momentarily increase to any extent. However, upon the decay of the third input pulse, a negative pulse will be produced across the diode 11 due to the action of the differentiating circuit and this negative pulse is of sufficient amplitude to lower the potential across diode 11 below the minimum sustaining voltage amplitude value so that diode 11 is thereby extinguished. Thus, the application of the third discrete pulse causes the then conducting diode 11 to become extinguished so that an indication of the third pulse is obtained when neither diode 10 or 11 is conductive.

Thereafter, the fourth voltage pulse will again cause diode 10 to become conductive, as previously described in connection with the application of the first input pulse to be counted; and will likewise produce a distinctive output pulse across terminals 15 and 16. Therefore, the circuit, including the gas tube diodes 10 and 11, functions to provide three different indication states for the relative occurrence of three discrete voltage pulses and also functions as a scale of three counter circuit since a single output pulse is provided for each third input pulse.

The following table of values may be given for a typical application of the circuit using NE-96 gas tube diodes and with a maximum potential of one hundred and forty volts supplied by the battery 12.

| | | |
|---|---|---|
| Resistor 20 | ohms | 68,000 |
| Resistor 21 | do | 20,000 |
| Resistor 23 | do | 6,200 |
| Resistor 24 | do | 20,000 |
| Resistor 25 | do | 39,000 |
| Resistor 26 | do | 2,200 |
| Capacitor 32 | mf | .1 |
| Capacitor 33 | mf | .22 |
| Capacitor 34 | mf | .01 |

Minimum amplitude for input pulse 150 volts.

The values for the pulse output circuit, including the transistor 22, resistors 35, 36 and capacitor 37, are suitably selected depending upon the choice of transistor 22 and would be obvious to anyone skilled in the art. Although the network, including resistors 25 and 26, has been specifically described for providing the relative difference in applied voltages across the respective diodes 10 and 11, it should be obvious that many other circuit arrangements may be provided to obtain the desired difference in normal potential across the diodes 10 and 11 and that, therefore, the invention and the appended claims are not limited to this specific circuit arrangement. Various modifications will occur to those skilled in the art.

What is claimed is:

1. A circuit for indicating the relative order of occurrence of discrete pulses having a voltage amplitude at least equal to a predetermined minimum and comprising, first and second constant current gaseous diode devices, means to apply a voltage across each device that is lower than the firing potential of each device by an amount that is less than the predetermined minimum amplitude of the pulses to be indicated and with the voltage across said first device greater than the voltage across said second device, a source of pulses to be indicated, and means including a differentiating coupling network for connecting the source of pulses to be indicated across the anode electrodes of each of said devices in a manner to add to and increase the voltages across said devices to thereby cause said first device to become conductive when neither of said devices are conducting, to thereby cause said second device to become conductive and extinguish said first device when said first device is conducting, and to thereby extinguish said second device when said second device is conducting, the relative states of conduction of said devices being indicative of the relative order of occurrence of pulses.

2. A circuit for indicating the relative order of occurrence of discrete pulses having a voltage amplitude at least equal to a predetermined minimum and comprising, a pair of pulse input terminals, first and second constant current gaseous two-electrode devices, means to apply a voltage across each device that is lower than the firing potential of each device by an amount that is less than the predetermined minimum amplitude of the pulses to be indicated and with the voltage across said first device greater than the voltage across said second device, a source of pulses to be indicated, and means including a differentiating coupling network for connecting the source of pulses to be indicated across the anode electrodes of each of said devices in a manner to add to and increase the voltages across said devices to thereby cause said first device to become conductive when neither of said devices are conducting, to thereby cause said second device to become conductive and extinguish said first device when said first device is conducting, and to thereby extinguish said second device when said second device is conducting, said coupling network comprising at least one capacitor in a series circuit between one of said terminals and one of the electrodes of said second device together with at least one capacitor in a series circuit between said one electrode of the second device and an electrode of said first device, the relative states of conduction of said devices being indicative of the relative order of occurrence of pulses.

3. A scale of three circuit for counting discrete pulses having a voltage amplitude at least equal to a predetermined minimum and comprising, first and second constant current diode devices, means to apply a voltage across each device that is less than the firing potential of each device by an amount that is lower than the predetermined minimum amplitude of the pulses to be counted and with the voltage across said first device greater than the voltage across said second device, a source of pulses to be indicated, means including a differentiating coupling network for connecting the source of pulses to be counted across the anode electrodes of each of said devices in a manner to add to and increase the voltages across said devices to thereby cause said first device to become conductive when neither of said devices are conducting, to thereby cause said second device to become conductive and extinguish said first device when said first device is conducting, and to thereby extinguish said second device when said second device is conducting, and means to produce a count signal responsive to current flow through one of said devices to thereby count each third successive pulse.

4. A scale of three circuit for counting discrete pulses having a voltage amplitude at least equal to a predetermined minimum and comprising, a pair of pulse input terminals, first and second constant current gaseous two-electrode devices, means to apply a voltage across each device that is lower than the firing potential of each device by an amount that is less than the predetermined minimum amplitude of the pulses to be counted and with the voltage across said first device greater than the voltage across said second device, a source of pulses to be indicated, means including a differentiating coupling network for connecting the source of pulses to be counted across the anode electrodes of each of said devices in a manner to add to and increase the voltages across said devices to thereby cause said first device to become conductive when neither of said devices are conducting, to thereby cause said second device to become conductive and extinguish said first device when said first device is conducting, and to thereby extinguish said second device when said second device is conducting, said coupling network comprising at least one capacitor in a series circuit between one of said terminals and one of the electrodes of said second device together with at least one capacitor in a series circuit between said one electrode of the second device and an electrode of said first device, the relative states of conduction of said devices being indicative of the relative order of occurrence of pulses and means to produce a count signal responsive to current flow through one of said devices to thereby count each third successive pulse.

References Cited in the file of this patent

UNITED STATES PATENTS

| | | |
|---|---|---|
| 2,593,375 | Williams et al. | Apr. 15, 1952 |
| 2,728,030 | Green | Dec. 20, 1955 |
| 2,787,780 | Morris | Apr. 2, 1957 |